United States Patent [19]

King et al.

[11] Patent Number: 4,565,999

[45] Date of Patent: Jan. 21, 1986

[54] LIGHT PENCIL

[75] Inventors: Allen King, Needham; Peter Collins, Danvers; Jay Goldman, Wellesley, all of Mass.

[73] Assignee: Prime Computer, Inc., Natick, Mass.

[21] Appl. No.: 466,074

[22] Filed: Apr. 1, 1983

[51] Int. Cl.[4] .............................................. G09G 1/00
[52] U.S. Cl. .................................. 340/706; 340/707; 340/708; 340/709; 340/825.19; 178/18
[58] Field of Search ............... 340/705, 706, 707, 708, 340/709, 710, 711, 712, 980, 825.19; 358/103, 104; 178/18; 356/152

[56] References Cited

U.S. PATENT DOCUMENTS

| | | | |
|---|---|---|---|
| 3,618,029 | 11/1971 | Graven . | |
| 3,885,096 | 5/1975 | Inuiya | 340/705 |
| 3,917,412 | 11/1975 | Stoutmeyer et al. | 356/152 |
| 3,917,955 | 11/1975 | Inuiya | 340/711 |
| 3,986,030 | 10/1976 | Teltscher | 250/349 |
| 4,028,725 | 6/1977 | Lewis | 358/103 |
| 4,103,435 | 8/1978 | Herndon | 358/104 |
| 4,109,145 | 8/1978 | Graf | 340/712 |
| 4,111,555 | 9/1978 | Ellis | 356/141 |
| 4,150,285 | 4/1979 | Brienza et al. | 250/203 |
| 4,209,255 | 6/1980 | Heynau et al. | 356/152 |
| 4,263,592 | 4/1981 | Takahashi et al. | 340/706 |
| 4,293,855 | 10/1981 | Perkins | 340/712 |
| 4,349,815 | 9/1982 | Spooner | 340/705 |
| 4,364,035 | 12/1982 | Kirsch | 340/707 |
| 4,369,439 | 1/1983 | Broos | 340/710 |
| 4,390,873 | 6/1983 | Kirsch | 340/707 |

FOREIGN PATENT DOCUMENTS

55-131841  10/1980  Japan .................................. 340/715

*Primary Examiner*—Gerald L. Brigance
*Attorney, Agent, or Firm*—Lahive & Cockfield

[57] ABSTRACT

A cursor control system for use with a data terminal having a display consists of a radiation source and associated radiation sensor. Either the source or sensor is fixed with respect to the display while the other is moveable and may be fixed to the user's head. The system translates the motion of the user's head into a directional signal for controlling cursor position on the screen.

19 Claims, 9 Drawing Figures

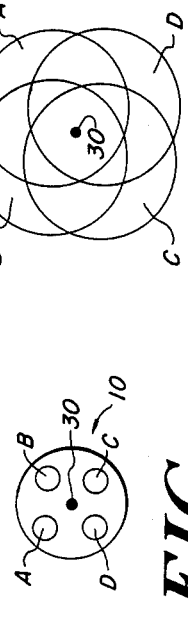
FIG. 2C
FIG. 2B
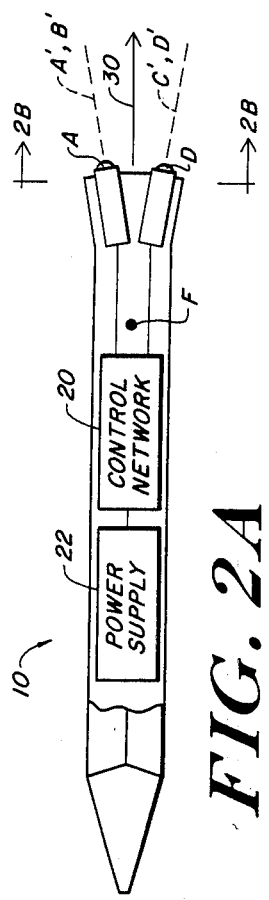
FIG. 2A
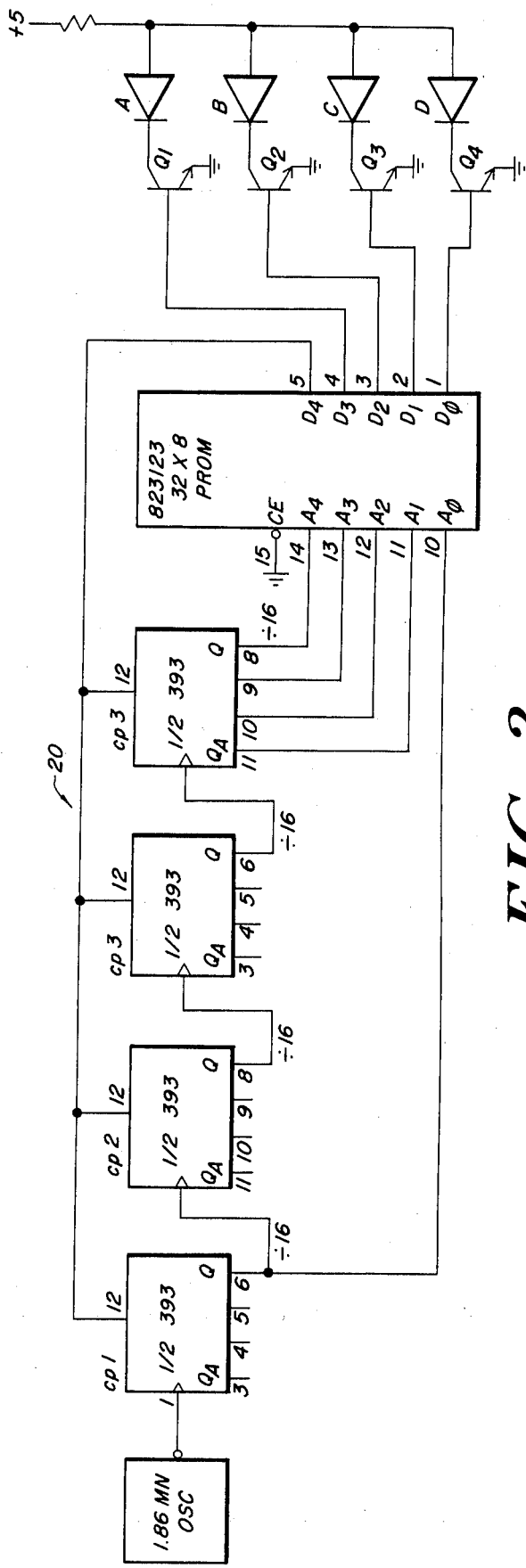
FIG. 3

LIGHT PENCIL

BACKGROUND OF THE INVENTION

The present invention is in the field of data processing and more particularly relates to data terminals having a display.

Data terminals generally incorporate a display for providing a visual indication to the operator of selected data. Typically, such a display has the form of a cathode ray tube (CRT) or other type of planar display, such as a liquid crystal display (LCD). A specific point on the display is often indicated to the operator by way of a localized illuminated region, referred to as a cursor. In many applications, for example, in data entry which might occur during a word processing operation, the cursor may be moved by the operator to any desired point on the display.

In the prior art, the positioning control for the cursor is typically provided by keys which must be manually depressed by the operator. Such keys are awkward because they must typically be hit multiple times to move the cursor across the screen. Another way to position a cursor is by use of a "mouse" or joystick. All of these approaches generally required the operator to move his hands from the normal keyboard position. As a result, the operator must re-position his hands with respect to the keys following the desired positioning of the cursor. These special motions to establish cursor control take time, and my lead to user errors which correspondingly reduce the efficiency of the operator interaction with the or a data processing system coupled to the terminal.

In the aviation field, it is known to use optical source and sensor pairs, one of each pair being coupled to a pilots's head and the other coupled to a fixed reference, so that the line-of-sight of the pilot can be tracked, eliminating the necessity of identifying a particular location by hand. See for example, U.S. Pat. Nos. 4,209,255 and and 3,917,412. However, while the latter patents disclose systems for tracking an operator's head motion, there is no disclosure of hands-free cursor control for a data terminal. Moreover, all motions of the operator's head are tracked.

It is an object of the present invention to provide hands-free cursor positioning for a data terminal.

It is another object to provide communication with a data processing system by way of operator head motion through a data terminal.

SUMMARY OF THE INVENTION

Briefly, the present invention is a cursor positioning system for a data terminal having a display. The system includes an radiation source and an associated radiation sensor. The radiation characteristic of one of the associated source and sensor has a substantially omnidirectional pattern over a predetermined angular segment. The optical characteristic of the other of the source and sensor corresponds to superposition of a plurality of directional patterns extending substantially from a single point. The "direction pattern" element may be a single element generating the specified directional patterns, or alternatively may be a composite element made of a plurality or individual directional pattern sub-elements. The plurality of patterns are substantially uniformly distributed over partially overlapping predetermined angular segments.

The sensor is adapted to generate a sensor signal associated with each of the directional patterns. The sensor signal is related to the radiational coupling between the source and sensor.

The position of at least one of the associate source and sensor is fixed with respect to the display. The position of the other of the associated source and sensor may be fixed with respect to the head of an operator of the system.

A motion processor is responsive to the sensor signal. This processor is adapted to extract operator motion signals from the sensor signals and to generate position signals from those signals. The position signals are representative of the orientation of the operator's head. This processor is further adapted to suppress portions of the sensor signal representative of predetermined operator head motions. A signal generator is responsive to the position signal to generate cursor signals adapted for controlling the position of a cursor on the display.

In the preferred form the directional pattern element of the source-sensor pair is fixed to the user's head while the ominidirectional element is affixed to the display. With this form, the resultant operation is highly sensitive to head rotational motions (orientation) but relatively insensitive to head translatinal motions. Where the omnidirectional pattern element is affixed to the head and with the directional pattern element affixed to the display, the system is principally responsive to translational head movements. However, in some embodiments of the invention, a pair of parallelly operating directional-omnidirectional source sensor pairs may be used, where one pair has its directional element affixed to the head and the other pair has its directional element affixed to the display. In such a system, the output signals from the two source-sensor pairs may be readily combined to produce a composite output signal which is strongly responsive to rotational head movements, and where the effects of translational head movements are substantially suppressed.

With all of these configurations, cursor position control is achieved for the terminal display in a "hands-free" manner. By way of example, the radiation source may be affixed to the operator's head, for example, as a "light-pencil" which may be positioned either on a retainer worn by the operator, or for example, positioned on the operator's ear. The radiation source may include four infra-red light emitting diodes, each having a directional radiation pattern, where the directional patterns extend along axes emanating substantially from a single point and overlay partially angular segments. Here, the optical sensor may be an infra-red sensitive device affixed to the terminal display. By suitably driving the LED's of the optical source, the relatively omnidirectional sensor, and associated coupled processing networks can determine the angular orientation of the operator's head, and transform that information into control signals for a cursor to correspondingly position the cursor within the field of view of the terminal display.

The processor, in some embodiments, may further be adapted to detect the portions of the sensor signal which represent these relatively high rate motions of the operator's head. In such embodiments, a succession of detected substantially vertical relatively rapid up and down nod motions may be decoded to represent a certain system command, for example, may represent an interactive "YES" response to data displayed to the operator at the display of the terminal. Similarly, a portion of the sensor signal representative of a succession of substantially horizontal left and right nod motions may denote "NO". Alternate forms of head motion may also be monitored, such as a single vertical relatively rapid up nod motion spaced apart in time from other nod motions, or similarly a single horizontal relatively rapid down nod motion spaced in part in time from other nod motions.

As a further advantage to the present invention, the system can be used to permit interactive control of a computer by an operator who is handicapped.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 2A shows partially in cut-away view, the light pencil of the embodiment of FIG. 1;

FIG. 2B shows an end view of the light pencil of FIG. 2A along lines 2B;

FIG. 2C shows the radiation pattern of the LED's of the light pencil of FIGS. 2A and 2B viewed from the light pencil;

FIG. 3 shows in schematic form the light pencil of the embodiment of FIG. 1;

DESCRIPTION OF THE PREFERRED EMBODIMENT

Figure 1:
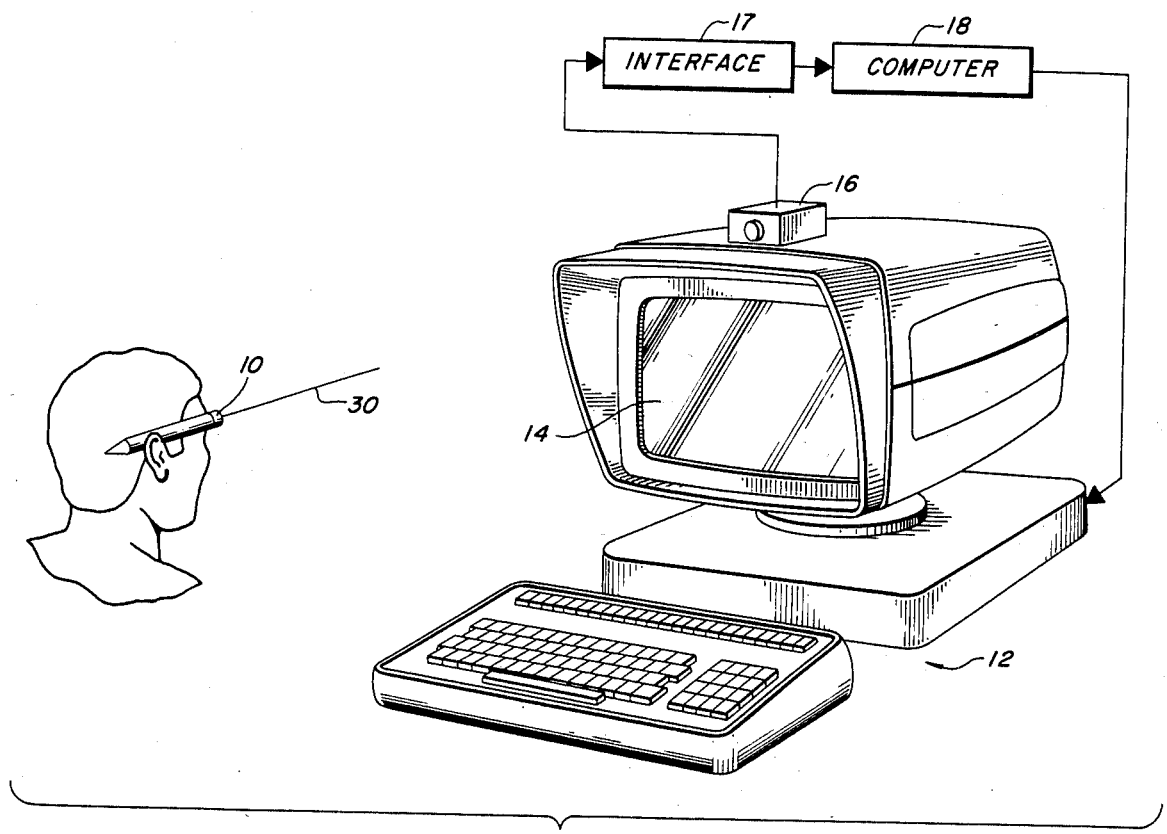
FIG. 1 shows an exemplary embodiment of the present invention.

FIG. 1 shows an embodiment of the present invention including a light pencil 10 (worn behind the ear of a user), a data terminal 12 including a display 14, an optical sensor 16, interface 17, and a computer 18. In this embodiment, the display 14 is a cathode ray tube, although other forms of display, such as liquid crystal displays, might also be used.

The light pencil 10 is shown diagrammatically in FIGS. 2A and 2B and schematically in FIG. 3. As shown, the light pencil 10 includes an array of four infrared (IR) light emitting diodes (LED's) A, B, C and D positioned about a reference axis 30, a control network 20 and power supply 22 within a "pencil"-shaped housing 24. The LED's are adapted to provide directional, partially overlapping radiation patterns having their principal axes A', B', C' and D', respectively, nonparallel and extending along individual axes extending from a common point (F) on axis 30 and in directions uniformly dispersed about axis 30. FIG. 2C shows the radiation pattern from LED's A, B, C, D viewed from pencil 10 along axis 30. While the present embodiment is described in terms of LED's, in other embodiments, alternative radiation or "light" sources and associated sensors might be used as R.F. emitters, ultrasonic emitters, or incandescent lights.

In the present embodiment, each LED in effect radiates principally in an associated angular segment (or quadrant) about axis 30. In the preferred form, the angular segments for LED's A and B are "above" and to the left and right respectively, of axis 30 and the angular segments for LED's C and D are "below" and to the left and right, respectively, of axis 30, where the left and right directions are as seen looking toward the light pencil 10 along axis 30. In the present embodiment, the principal axes are 30 degrees offset from axis 30. In other embodiments, different numbers of LED's may be used, and the LED's may radiate over different sized angular segments.

The schematic diagram of FIG. 3 shows the control network 20 and LED's A, B, C and D. Network 20 includes an oscillator, four divider networks (type 393), a 32×8 PROM (type 823123) and four driver transistors for the respective LED's. The following table shows the program data stored in the PROM.

| PROM | PROGRAM DATA |
| --- | --- |
| 0 | 00 |
| 1 | 0F |
| 2 | 00 |
| 3 | 01 |
| 4 | 00 |
| 5 | 02 |
| 6 | 00 |
| 7 | 04 |
| 8 | 00 |
| 9 | 08 |
| 10 | 00 |
| 11 | 00 |
| 12 | 10 |
| 13 | 00 |
| 14 | 00 |
| 15 | 00 |

With this configuration, the LED's of the light pencil 10 emit radiation on a cyclical basis having a 12 msec period, with each LED producing a 2 msec, 1024 IR pulse burst (for synchronization) at the beginning of each cycle, followed by a second 2 msec, 256 IR pulse burst later in the cycle. The A-LED provides its second burst immediately following the synchronization burst, the B-LED provides its second burst immediately following that of the A-LED and the C- and D-LED's provide similarly delayed bursts. The cycle terminates with a 2 msec dead time for each LED.

Figure 4A:
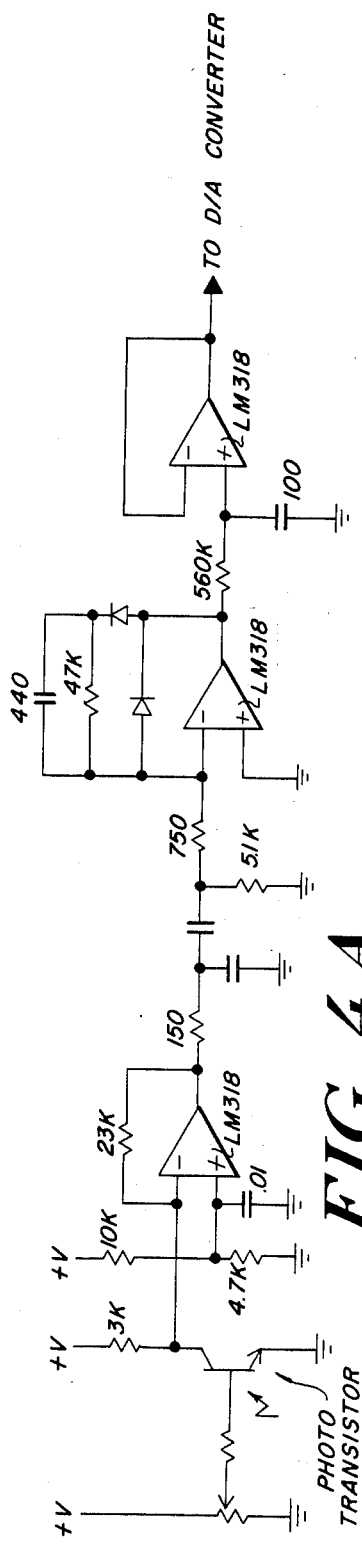
FIGS. 4A and 4B show in schematic form, the sensor 16 of the embodiment of FIG. 1.
Figure 4B:
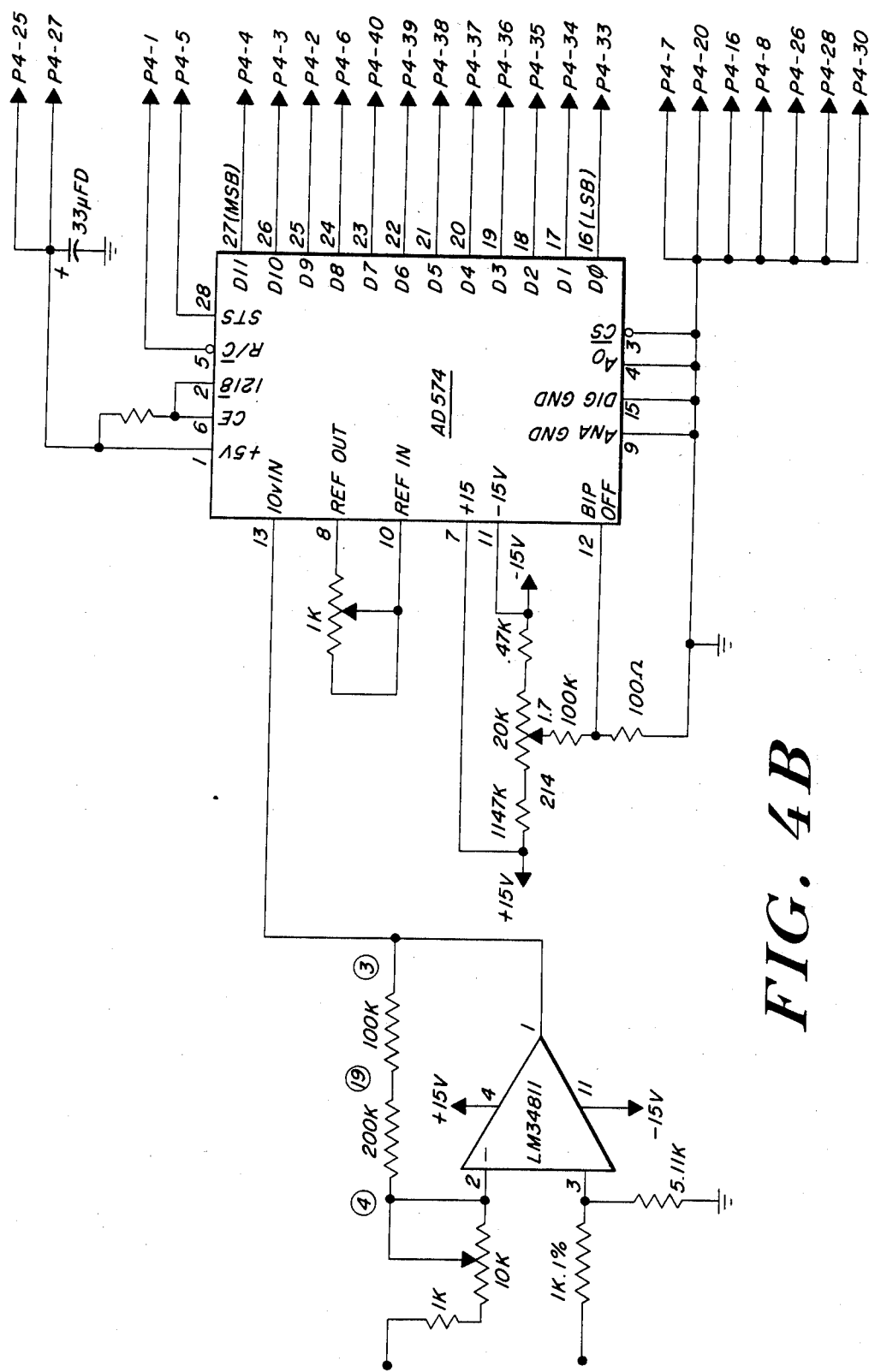

In the illustrated embodiment of FIG. 1, data terminal 12 and its associated display 14 is a conventional type terminal including a raster scan CRT display and an input for a signal for controlling the cursor position. As shown in FIG. 1, the optical sensor 16 is affixed to the top of the display housing. The sensor 16 is shown in schematic from in FIGS. 4A and 4B and includes an IR sensitive phototransistor, an associated sensor amplifier (in FIG. 4A) and an analog-to-digital (A/D) converter (in FIG. 4B). The phototransistor has a substantially omnidirectional optical characterization over a predetermined angular segment.

In the light pencil 10 of the preferred embodiment, the orientations of the LED's A, B, C and D are oriented as described above so that the angular segments of the radiation pattern of the LED's A, B, C and D overlap in the IR sensitive region of the sensor 16 (as shown in FIG. 2C) over the desired range of motion of the operator's head with respect to the display CRT. By way of example, for nominal motions of an operator's head (with the light emitting end of the light pencil positioned behind the operator's ear as shown in FIG. 1) with respect to the CRT, and with a type TIL 99 phototransistor the angular offsets (from axis 30) for the principal axes of the type TIL 38 LED'S A, B, C and D dispersed uniformly about axis 30 is 30 degrees.

The digital output of the A/D converter is coupled by way of interface 17 to the computer 18. In the present embodiment, the interface is a peripheral interface adapter (type MC6840) and the computer is a microprocessor (type MC68000) having associated memory for storing the programs shown in Appendices A and B. Generally, the microprocessor operates under control of the program in Appendix A to control the A/D converter and receive the data produced by the A/D converter. Then the microprocessor operates under the control of the program in Appendix B to extract operator motion information from the signals from the sensor, and to generate digital position signal representative of the operator head position. By identifying the synchronization pulse bursts from the LED's and then the relative time of occurrence and the amplitudes of the subsequent pulse bursts in a cycle, the microprocessor can resolve to orientation of the light pencil 10. In one form of the invention, the microprocessor determines the X (horizontal) and Y (vertical) coordinates of the direction of the light pencil 10 by determining the following ratios of the detected intensities:

$$X = \frac{B' + C'}{A' + B' + C' + D'}$$

$$Y = \frac{A' + B'}{A' + B' + C' + D'}$$

where A', B', C' and D' represent the detected intensities from the LED's A, B, C, and D, respectively.

In an alternate form of the invention, particularly adapted for LED's in which optical radiation intensity is related to angle by the relationship between the radiation intensity and angle is substantial gaussian (i.e. proportional to $e^{-k(angle)^2}$, where k is a constant), the microprocessor determines the coordinates X and Y as follows:

$$X = \log(B' + C') - \log(D' + A')$$
$$Y = \log(A' + B') - \log(C' + D')$$
$$X = -k((angle\ BC)^2 - (angle\ DA)^2)$$
$$\quad = -k'(horizontal\ angle)$$
$$Y = -k((angle\ AB)^2 - (angle\ CD)^2)$$
$$\quad = -k'(vertical\ angle)$$

Thus, in the latter form, X and Y are linear functions of angles.

In summary, in operation, the LED's A, B, C and D are sequentially pulsed in light pencil 10. The detected IR signal at sensor 16 is initially amplified, then filtered in a narrow bandpass filter (to suppress ambient noise), and rectified and finally filtered in a lowpass filter. Then the amplitude of the signal related to the detected signal from each LED is sequentially converted to a 12-bit digital signal for sampling by the microprocessor.

The microprocessor controls the A/D converter to convert the amplitude signals in that converter to head position signals, by detecting the synchronization pulse burst, determining the timing of the waveform from the light pencil 10, and performing the computations indicated above to obtain X and Y values. Additional processing is also performed by the microprocessor for smoothing and jitter removal. The microprocessor also monitors for head nods which may provide interactive signalling between the operator and the terminal.

Figure 5:
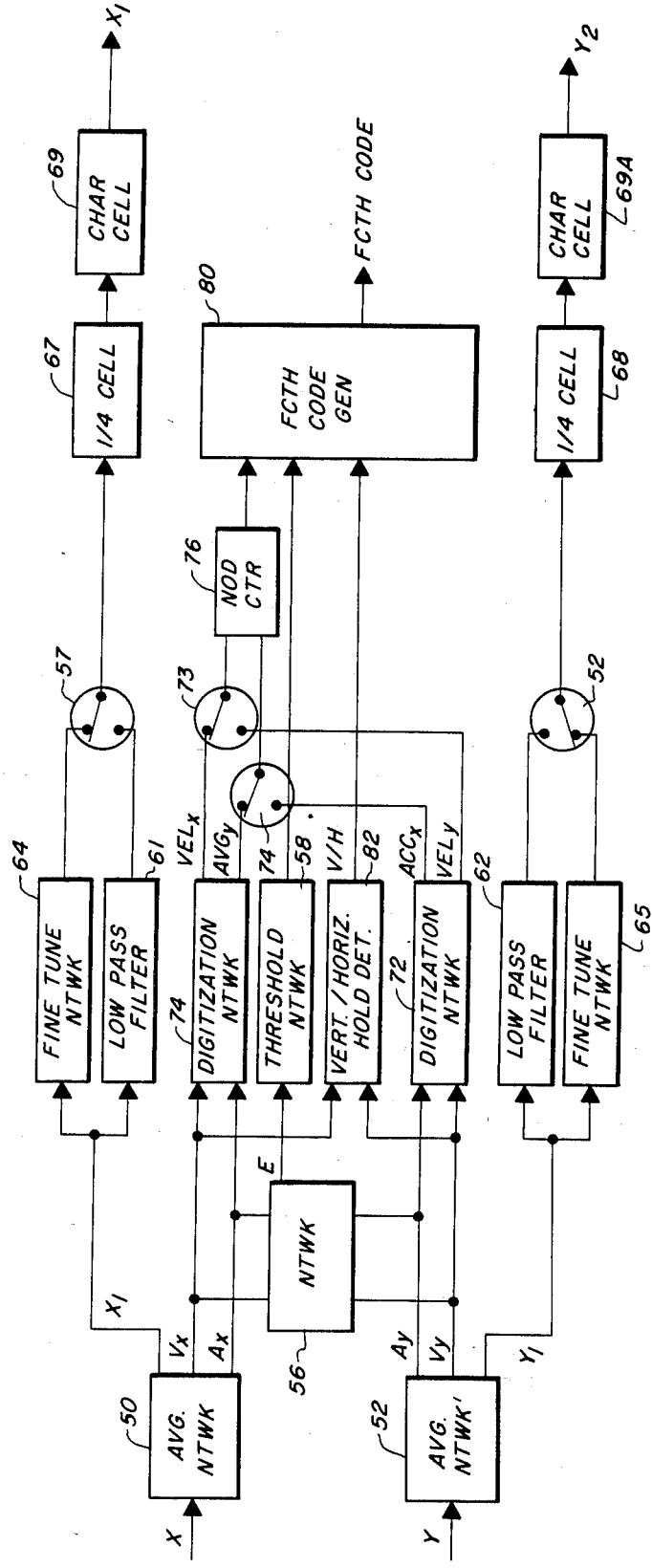
FIG. 5 shows in block diagram form a portion of the functional structure of the microprocessor of the embodiment of FIG. 1.

The functional structure in the microprocessor for performing this additional processing is shown in FIG. 5. This system compensates for the motor system and human body kinetics. This portion in FIG. 5 includes three-point rolling average networks 50 and 52 which provide at their output signals representative of the position, velocity and acceleration of the light pencil 10 in both the X and Y directions. In the present embodiment, the velocity and acceleration signals are directed to that energy computation network 56 which computes a value representative of the "energy of motion" (E) of the light pencil 10 in accordance with the formula:

$$E = V_X^2 + V_Y^2 + K''(A_X^2 + A_Y^2)$$

where $V_X$, $V_Y$, $A_X$, and $A_Y$ are the three-point rolling average values of the position velocity and acceleration, respectively, of the light pencil 10 as determined by networks 50 and 52. The value E is compared in a threshold network 58 to a minimum energy threshold to provide a control signal E'.

The three-point average signals $X_1$ and $Y_1$ are selectively applied to one of two pairs of filter networks. The first pair (networks 61 and 62) are lowpass filter networks to be used when the light pencil 10 is moving quickly toward the vicinity of a point. The second pair (filter networks 64 and 65) are fine tuning networks which are active when the pencil is moving slowly. The control to switch between the respective pairs of filter networks by the threshold signal E'.

The output from the filter networks (by way of switches S1 and S2) are coupled to ¼ character cell hysteresis circuits 67 and 68, from which the signals are quantized in character cells 69 and 69A. This hysteresis processing prevents the cursor from jumping back and forth if it points to a boundary between two cells.

The three-point average acceleration and velocity signals are applied by way of digitization networks 70 and 72 and switches 73 and 74 to horizontal and vertical nod counter respectively. The nod detectors count the number of cycles of the velocity and acceleration for both the horizontal and vertical directions. The velocity is approximately sinusoidal, and the acceleration leads the velocity by 90 degrees. As a result, the input to the counters is relatively noise insensitive. The number of cycles while the energy signal E is above threshold is counted. This count is used to distinguish Single nods (either vertical or horizontal, depending on the position of switches 73 and 74) which have a single major inflection from "yes" or "no" motions, which have many inflections. The microprocessor further includes a function code generator 80 which is responsive to the threshold block 58 to generate an appropriate function code when the energy falls back below a threshold. A vertical/horizontal nod detector 82 provides an appropriate signal to the function code generator 80 to generate a function code to distinguish a vertical from a horizontal nod. This signal, in conjunction with the signal from the nod counter 74, provides function codes representative of the particular type of nod detected.

In operation, as an operator moves the light pencil through his head motion, the microprocessor generates signals $X_2$ and $Y_2$ which control cursor position. These position signals effectively disregard certain operator motions, such as the nod motions. Moreover, the energy of motion operation (determined in network 56) controls the switches 51 and 52 to establish tracking of the cursor in different modes using blocks 61 and 62, or blocks 64 and 65), depending on the velocity and acceleration of the head motion.

The illustrated embodiment incorporates a light pencil having four directional radiation sources having their principal axis offset from a nominal central axis affixed to the operator's head and a single relatively omnidirectional radiation sensor affixed to the display. Other forms may also be used. By way of example, a directional source affixed to the user's head may be established by an array of passive, directional reflectors which are affixed to the head and which are adapted to be illuminated by a remote radiation source, for example, affixed to the display. In effect, the array of reflectors would then operate in the same manner of the above described array of radiation sources.

These forms are all relatively highly sensitive to rotational motions of the user's head, although there generally is a lesser component in the sensor output signal which is related to the translational motions of the user's head. In order to suppress this translational component, a similar secondary source-sensor system may be incorporated in parallel with the primary source-sensor system.

The secondary system includes the directional element of its source-sensor pair affixed to the display, while the omnidirectional element is affixed to the user's head. The resultant sensor signal from the secondary system is strongly dependent on the translational head motions only. This signal can be combined with the signal from the primary system signal to offset or suppress the translational motion component. Again, as with the primary system, either the source or sensor of each pair may be the omnidirectional element.

In cases where the sensor is affixed to the user's head, the output signals must be transferred back to the terminal processor.

Figure 6:
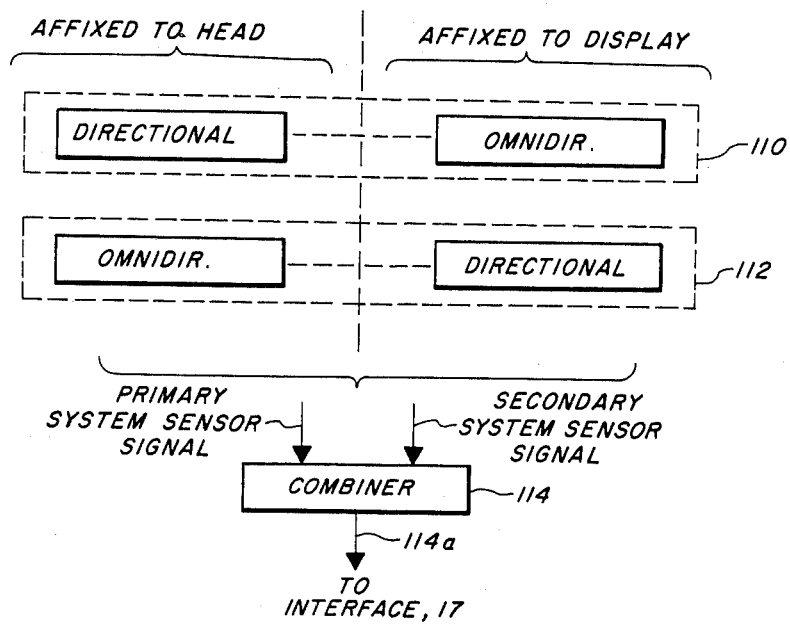
FIG. 6 shows in block diagram form a variant of the system of FIG. 1.

FIG. 6 shows such exemplary primary system radiation source-sensor pair 110 and secondary system radiation source-sensor pair 112. The sensor signals from pairs 110 and 112 are applied in a Combiner 114. Combiner 114 combines those signals to provide a signal principally representative of head rotational motions, while suppressing components due to head translational motions.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX A

```
* pencil cursor -- interupt service routine
*
ptmcr1   equ    $3ff61              cr20=1,write only
ptmcr2   equ    $3ff63              write only
*ptmcr3  equ    $3ff61              cr20=0,write only
*ptmstat equ    $3ff63              read only
*        note: ptmsbuf (write_only buffer) can also be
*              accessed at addresses $3ff69 & $3ff6d .
ptmsbuf  equ    $3ff65              write only
tlcntrm  equ    $3ff65              read only
tlcntrl  equ    $3ff67              read only
tllatch  equ    $3ff67              write only
pldra    equ    $3ff40
pldrb    equ    $3ff42
plcra    equ    $3ff44
plcrb    equ    $3ff46
p2cra    equ    $3ff45
*
* initialization
*
q3size   equ    4*5                 4 samples at 5 words each
ptr3ii   dc.w   ptr3it              in-pointer
ptr3io   dc.w   ptr3it              out-pointer
ptr3it   ds.w   q3size              top of queue
ptr3ib   equ    *                   bottom of queue
piinit   jmp    penin2
getxy    jmp    getxyl
penin2   move.l #penstk,penreg+4
         move.l #start,penstk
         move.l #tmrint,$74         level 5 interupt vector
*
         move.b #1,ptmcr2            set cr20 to access ptmcr1
         move.b #1,ptmcr1            internal reset
         movea.l #ptmsbuf,a3
         move.w #tds,d0
         movep.w d0,0(a3)
         move.b #$62,ptmcr1          enable timer t1
* bit7  =0  don't drive ox
* bit6  =1, dirve irq
* bits3-5=4, single-shot
* bit2  =0, 16-bit counting
* bit1  =1  count e-clocks
* bit0  =0  enable all timers
         move.b #$34,p2cra           set to access data reg (not dir)
         move.w #ptr3it,ptr3ii
         move.w #ptr3it,ptr3io
         rts
*
tmrint   move.b #$34,plcra           start ad converter
         movem.l d0/d1/a0/a7,mainreg timer interrupt just occured
```

```
                movem.l penreg,d1/a0/a7      . resume pencil isr
tmrl            move.b  plcra,d0
                andi.b  #$80,d0
                beq     tmrl
                move.b  #$3c,plcra           stop coonvert, enable outputs
                move.w  pldra,d0
                rts
*
* the co-routine below goes here *
*
*
getpen          equ *
                movem.l d1/a0/a7,penreg      wait for next pen sample
                movea.l #ptmsbuf,a0
                movep.w d0,0(a0)
                movem.l mainreg,d0/d1/a0/a7  . by returning to main
                rte
*
* timing diagram:
************************************************************
*                                        //
*            dead | find | await next|await next  |await next  |
*                 |      |    a      |    b       |   ...e     |
*        samples *******      *           *        ...    *
*                                                 ...
*       |<-------->|||||||<----------->|<----------->|<---------->|
*           tds       tfs       tns           tbs        ..tbs
*                                 ,-----------.         ...
*------. received signal:/|||||||||||||||\           .-----------.
*||||||\               /|||||||||||||||||||----------'|||||||||||||\
*||||||||>------------<|||||||||||||||||||||||||||||||||||||||||||||>-------
*||||||/               \|||||||||||||||||||          .|||||||||||||/
*------'                 \|||||||||||||||/            '-----------'
*                          '-------------'            ...
************************************************************
mpuclk      equ     8                   68000 clock rate in mhz
tds         equ     $99e*mpuclk+$a0     time between end of this burst and
tns         equ     $b0*mpuclk          time between sync edge and sync led
tbs         equ     $e0*mpuclk-$50      time to next led
tfs         equ     $100*mpuclk         find sample
thresh      equ     $100              . sync detection threshold
cds         equ     8                   number of samples till no sync repo
*
* find sync pulse
*
start       move.w  #cds,d1             inz counter to detect no sync
s1          move.b  #$34,plcra          start ad converter
s11         move.b  plcra,d0
            andi.b  #$80,d0
            beq     s11
            move.b  #$3c,plcra          stop convert, enable outputs
            move.w  pldra,d0
            cmp.w   #thresh,d0
            dbgt    d1,s1
            bgt     s0
*
* no sync found, delay a little and try again
*
s2          move.w  #tfs,d0
            bsr.s   getpen
            cmp.w   #thresh,d0  see if anything is there
            bgt     s2
            bra     start
s0          equ     *
```

```
*
* await first sample time
*
        move.w   #5,sampln
        move.w   ptr3ii,a0
        move.w   #tns,d0              await time to sample sync led value
*
* loop to sample led values a, b, c, d, and e
* the result is stored in a tumble table pointed to by a0
*
s3      bsr.s    getpen
        move.w   d0,(a0)+
        cmpa     #ptr3ib,a0
        blt.s    s5
        move.w   #ptr3it,a0
s5      move.w   #tbs,d0
        subi.w   #1,sampln
        bne      s3                   loop over samples a, b, c, d, e
        move.w   a0,ptr3ii
*
* skip over the dead period
*
        move.w   #tds,d0
        jsr      getpen
        jmp      start
*
****************************************************************
*
*   d0    w
*   d2    x
*   d3    y
*   d4    z
*   d7    loop counter
*
*   a1    (led(i))
*   a2    (bright(i))
*   a3    (rotate(i))
*
getxyl  link     a0,#-16
        clr.l    -6(a0)
*
        moveq.w  #$00,d5
        move.w   ptr3io,a1    if not a full sample in que, return '0'b
        clr.l    d0
        move.w   ptr3ii,d0
        sub.l    a1,d0        compute number of words in queue
        add.l    #q3size,d0   add table-length to make >=0
        divu     #q3size,d0   mod table-length
        swap     d0
        tst.w    d0
        beq      yy5
        cmp.w    #10,d0       see if it is at least one sample's wor
        bge      yy14
        move.w   ptr3ii,ptr3io    queue screwed up, reset it!
        bra      yy5
*
yy14    jsr      getw
        movea.l  #bright,a2
        movea.l  #rotate,a3
        move.w   #4-1,d7
        clr.l    d2
        clr.l    d3
        clr.l    d4
*** w = l(i) * bright(i)
```

```
loop    jsr     getw                    get intensity
        mulu    (a2)+,d0                scale it by brightness, make w
        swap    d0                      make it w
*       put rcvr-1 here someday
***  x = x + w * rotate(i)
        move.w  d0,d1
        mulu    (a3)+,d1                v*rotate(i)
        swap    d1
        add.w   d1,d2
***  y = y + w * rotate(i)
        move.w  d0,d1
        mulu    (a3),d1                 v*rotate(i)
        swap    d1
        add.w   d1,d3
***  z = z + w
        add.w   d0,d4
*       loop
        dbra    d7,loop
        move.w  a1,ptr3io
*
***  x = x / z
        swap    d2
        divu    d4,d2
        mulu    #$2000,d2
        swap    d2
        sub.w   #$800,d2
xx4     movea.l $c(a0),a4               xx
        move.w  d2,(a4)                 save it away
*
***  y # y / z
        swap    d3
        divu    d4,d3
        mulu    #$2000,d3
        swap    d3
        sub.w   #$800,d3
yy4     movea.l $10(a0),a4              yy
        move.w  d3,(a4)                 save it away
*
        moveq.w #$80,d5                 '1'b returned if value found
yy5     unlk    a0
        rts
*
getw    cmpa.w  ptr3ii,a1               await an input
        beq     getw
        move.w  (a1)+,d0                get it
        bne     get3
        moveq.l #10,d0                  help prevent divide by zero
get3    cmpa.w  #ptr3ib,a1
        blt     get2                    update pointer
        move.w  #ptr3it,a1
get2    rts
*
rotate  dc.w    $ffff,$ffff,0,0,$ffff
bright  dc.w    $2000,$2000,$2000,$2000,$2000
*
*
mainreg ds.l    4                       storage for main programs's registe
penreg  dc.l    0,0                     storage for pencil_cursor's registe
        dc.l    penstk                  . a7
        ds.l    100
penstk  dc.l    start                   pencil_cursor's stack, contains pc
        ds.l    100
sampln  ds.w    1
        end
```

APPENDIX B

```
/*******************************************************************
 *                                                                 *
 *      PEN_DRVR   --   returns clean coordinates from pen         *
 *                 --   maintains nod and offscreen status         *
 *                                                                 *
 *******************************************************************

Bugs:
*/
pen_drvr: procedure (r_addr) returns (fixed bin(15));
dcl r_addr pointer;                /* used to base ret_val.x,y          */ dcl status fixed bin(15); /* return status, see pen.dcl for values */
/*
Variables and Data Flow:

raw = current value read from pen     -----> nod detector
        |                    |                          |
        |   (n-point averager)    '- vel ---------------'|
        c                                                |
        |   (fine tuner algorithm, a=state )             |
        b                :
        |   (hysterisis, screen-size, screen-limits)     |
        h                                                |
        |\                                               |
        | s = last stationary point ---------------------'
        |/
        ret_val = value returned
*/
%include 'm68k>include>error';
%include 'm68k>include>flags';
%include 'global.dcl';
%include 'arith.dcl';
%include 'pen.dcl';
%include 'pr_numb.dcl';
%include 'xy_string.dcl';

/*SUSPENSION PARAMETERS, TO TUNE THE DYNAMICS OF THE PENCIL */
dcl 1 suspension static external,
    2 n_roll fixed bin(13) initial(3),        /* "n" in "n"-point rolling avera 2 kx fixed bin(15) initial(70),           /* gain of fine tuner */
    2 llx fixed bin(15) initial(4),           /* fine tuner region size */
    2 ky fixed bin(15) initial(70),           /* gain of fine tuner */
    2 lly fixed bin(15) initial(2),           /* fine tuner region size*/

2 tuner_delay fixed bin(15) initial (25), /* discharge vel for fine tuner*/
    2 tuner_vel fixed bin(15) initial(500),   /* max vel for fine tuner*/

2 box_hist fixed bin(15) initial(20),     /* box histerisis (Note 2)
    2 stationary_threshold fixed bin(15) initial(150),/* max stationary vel (Not 2 vel_of_nodd(0:1) fixed bin(15) initial (400,200),
                            /* velocity threshold to trigger nodd */
    2 moving_count_max(0:1) fixed bin(15) initial (4,4),
    2 stationary_count_max fixed bin(15) initial(3),/*max no-motion time within
    2 moving_count_min fixed bin(15) initial(2),
    2 max_pos_nodd fixed bin(15) initial(3000),
```

```
    2 min_pos_nodd fixed bin(15) initial(300),
    2 max_vel_nodd fixed bin(15) initial(512);

/* Note 2: in 1/4096'th screen, Note 3: in 1/30 sec              */ dcl 1 raw,            2 x fixed bin(15), 2 y fixed bin(15);
/* raw.x, raw.y are assumed to have a useful dynamic range of 0 to 4096 */

/* N-POINT FILTER VARIABLES */
dcl (old_x(30), old_y(30)) fixed bin(15) static initial((30)0);
dcl (old) fixed bin(14) static initial(1);
dcl (sa_x, sai_x, sa_y, sai_y) fixed bin(23) static initial (0);
dcl n_roll3 fixed bin(15) static;
dcl 1 vel,            2 x fixed bin(15), 2 y fixed bin(15);
dcl 1 c static,       2 x fixed bin(15), 2 y fixed bin(15);

/* FINE TUNER ALGORITHM */
dcl tuner_vel_delay static fixed bin(15);
dcl abs_vel_fast static bit(1);
dcl (lx,ly) static fixed bin(15);/* constants for fine-tuner alg    */
dcl 1 a static,       2 x fixed bin(15), 2 y fixed bin(15);

/* NODD DETECTOR */
dcl(state,                      /* 0 if moving slowly, 1 in nodd    */
                                /* velocity (+1,0,-1) & direction(0,1)*/
    sddir, sdvel,               /*    ot starting motion            */
    cdvel,                      /*    of last time dvel ^=0         */       */
    wiggle_count, stationary_count,   /* count wiggles and time
    moving_count) static fixed bin(15);
dcl canc_nod static bit(1);
dcl(dvel, ddir) fixed bin(15);  /*    ot current pen motion         */
dcl (buff_count, buff_wiggle_ct) fixed bin(15);
dcl (vell, pos) fixed bin(15);
dcl (pos_min, pos_max, vel_max) static fixed bin(15);

dcl 1 b,              2 x fixed bin(15), 2 y fixed bin(15);
dcl 1 h static,       2 x fixed bin(15), 2 y fixed bin(15);
dcl 1 i static,       2 x fixed bin(15), 2 y fixed bin(15);
dcl 1 j,              2 x fixed bin(15), 2 y fixed bin(15); /* temp   */
dcl 1 s static,       2 x fixed bin(15), 2 y fixed bin(15);
dcl 1 ret_val based(r_addr), 2 x fixed bin(15), 2 y fixed bin(15);
dcl output char(1);
dcl 1 ptr3ix based (addr(ptr3i)),
    2 null1 fixed bin(7) unaligned,
    2 in_ptr fixed bin(7) unaligned,
    2 null2 fixed bin(7) unaligned,
    2 out_ptr fixed bin(7) unaligned,
    2 data(2:22) fixed bin(15);          /*space for 4 samples*/
dcl ptr3i external fixed bin;
dcl ii fixed bin(15);

/*BUGS
    integrate with interupt service routine
    not looking on screen
    conversion parameter adjustment*/

%replace x_screen by 80;        /* number of columns on screen      */
%replace y_screen by 24;        /* number of rows on screen         */
/*---------------------------------------------------------------*/
if ^switch then do;
    if ^getxy(raw.x,raw.y) then return (-1);
    end;
else do;
```

```
        ii = out_ptr-in_ptr;
        if ii>=0 & ii<10 then return(-1);
        raw.x = divide(log(data(out_ptr+1)+data(out_ptr+2))
                      -log(data(out_ptr+3)+data(out_ptr+4)),64,15);
        raw.y = divide(log(data(out_ptr+2)+data(out_ptr+3))
                      -log(data(out_ptr+4)+data(out_ptr+5)),64,15);
        if out_ptr >= hbound(data,1) then out_ptr = lbound(data,1);
        else out_ptr = out_ptr + 5;
     end;
     status = 0;
     jjj = jjj + 1;  if jjj > 80 then jjj= 1;
  /* sa_x = sum all x            ***************************************/
  /* sa_x = sum all x, weighted    * N-POINT ROLLING AVERAGE, and vel   */
  /* (rms fit on slope yields vel) ***************************************/
     if n_roll > 1 then do;
        sa_x  = sa_x               + raw.x              - old_x(old);
        sai_x = sai_x - 2*sa_x + raw.x*(n_roll+1) + old_x(old)*(n_roll-1);
        sa_y  = sa_y               + raw.y              - old_y(old);
        sai_y = sai_y - 2*sa_y + raw.y*(n_roll+1) + old_y(old)*(n_roll-1);
        old_x(old) = raw.x;
        old_y(old) = raw.y;
        old = old+1; if old > n_roll then old = 1;
        c.x = divide(sa_x,n_roll,15);
        c.y = divide(sa_y,n_roll,15);
        vel.x = divide(sai_x,n_roll3,15);
        vel.y = divide(sai_y,n_roll3,15);
  /* redundant check */
        dcl (sb_y, sbi_y) fixed bin(23);
        dcl (si, sw, ii3) fixed bin(15);
        sw = -n_roll + 1;
        si = old;
        sb_y=0; sbi_y=0;
        do ii3 = 1 to n_roll;
           sb_y = sb_y + old_y(si);
           sbi_y = sbi_y + sw*old_y(si);
           sw = sw + 2;
           si = si + 1; if si > n_roll then si = 1;
           end;
  /* buff.x(jjj) = divide(sb_y,n_roll,15);*/
  /* buff.vx(jjj) = divide(sbi_y,n_roll3,15);*/
        if sa_y ^= sb_y | sai_y ^= sbi_y then call error;
  /* end redundant check */
        end;
     else do;
        vel.x = raw.x - c.x;
        vel.y = raw.y - c.y;
        c = raw;
        end;
     buff.x(jjj) = c.x;
     buff.y(jjj) = c.y;
     buff.vx(jjj) = vel.x;
     buff.vy(jjj) = vel.y;
     if abs(vel.x)+abs(vel.y) > tuner_vel then tuner_vel_delay = 0;
     else tuner_vel_delay = tuner_vel_delay + 1;
     if tuner_vel_delay < tuner_delay then do;
        if ^abs_vel_fast then do;
           abs_vel_fast = true;
           call xy_string (60,0,'            ');
           end;
        b = c;
        a = c;
        end;
     else do;
        tuner_vel_delay = tuner_delay;
```

```
      if abs_vel_fast then do;
         abs_vel_fast = false;
         call xy_string (60,0,'fine tuner');/******************************/
         end;                            /*      Fine tuner Algorithm        */
      if c.x< a.x - lx then do;          /*        a = center point          */
         b.x  = c.x+ mult(lx,(k8-kx));/*-       b = output        / slope l*/
         a.x  = c.x+ lx;                 /*      ^                /          */
         end;                            /*      |               /           */
      else if c.x> a.x + lx then do;/*          |     /----a----' slope kx*/
         b.x  = c.x- mult(lx,(k8-kx));/*******  V    /       <-lx->        */
         a.x  = c.x- lx;
         end;
      else b.x  = a.x + mult(c.x-a.x,kx);
      if c.y< a.y - ly then do;
         b.y  = c.y+ mult(ly,(k8-ky));
         a.y  = c.y+ ly;
         end;
      else if c.y> a.y + ly then do;
         b.y  = c.y- mult(ly,(k8-ky));
         a.y  = c.y- ly;
         end;
      else b.y  = a.y + mult(c.y-a.y,ky);
      end;
                                         /******************************/
                                         /*       box histerisis        */
   if h.x < b.x-box_hist then h.x = b.x-box_hist;/**********************/
   if h.x > b.x+box_hist then h.x = b.x+box_hist;
   if h.y < b.y-box_hist then h.y = b.y-box_hist;
   if h.y > b.y+box_hist then h.y = b.y+box_hist;
                                         /******************************/
                                         /* convert from [0,4095] to ROW/COL  */
                                         /*              [0-x(y)_screen]*/
                                         /******************************/
   ret_val.x = mult(mult(h.x,x_screen*16),1);
   ret_val.y = mult(mult(h.y,y_screen*16),1);

if ret_val.x < 0         then do; status=-2; ret_val.x = 0;          end;
   if ret_val.x >=x_screen  then do; status=-2; ret_val.x = x_screen-1;end;
   if ret_val.y < 0         then do; status=-2; ret_val.y = 0;          end;
   if ret_val.y >=y_screen  then do; status=-2; ret_val.y = y_screen-1;end;
   if status = -2 then do;
      j = ret_val;                       /* return last stationary value    */
      ret_val = s;                       /* thereafter return offscreen val */
      s = j;
      end;

/* BEGIN NOD FILTER */
   if max(abs(vel.y),abs(vel.x)) < stationary_threshold & state=0 then do;
      status = 1;
      s = ret_val;
      end;

/*****************************         *****************************
*      \ (record)/        *           *     ANALIZE HEAD NODS       *
*       _____/         *           *****************************
*perp   |steady perpendicular*        TIMING DIAGRAM:
* (abot)| (tmo)|  (abort)   *                 .------.  changing
*       |_____|            *                /        \_v_____
*       /      \            *               /          \
*      /        \           *          home |moving|stdy*moving|stdy| home
*     / (record) \          *          graph: |ABCDEFG1234*ABCDEFG12345
*****************************                 |=start, *=change dir'n
                                              X=moving count too small
```

```
                                        x=moving count too big
                    when status: w= wiggle count too smal
                                 n= canc_nod
                                 P= size too big
                                 p= size too small
                                 V= velocity too big           */
buff_count = rank(' ');
buff_wiggle_ct = rank(' ') - rank('0');
dvel = 0;
if (state=0 & abs(vel.x)>abs(vel.y))  /* if first inflection look at vel*/
 | (state^=0 & sddir=0)  then do;     /* if not first, look at first   */
   vell = vel.x;
   pos = c.x;
   ddir = 0;                          /* x nodd (horizontal)           */
   end;
else do;
   vell = vel.y;
   pos = c.y;
   ddir = 1;                          /* y nodd (vertical)             */
   end;
if vell>vel_of_nodd(state) then dvel = +1;
else if vell<-vel_of_nodd(state) then dvel=-1;
pos_min = min(pos_min,pos);
pos_max = max(pos_max,pos);
vel_max = max(vel_max,abs(vell));
if state=/*home*/0 then do;
   if dvel^=0 /*moving fast*/ then call start_nodd;
   end;
else if /*steady*/dvel=0 then do;
   stationary_count = stationary_count+1;    /* timeout to end nod when station
   buff_count = stationary_count + rank ('0');
   if stationary_count > stationary_count_max then do;
      pos_max = pos_max - pos_min;
/*    call pr_numb(pos_max,10,4);*/
      if wiggle_count<=0 then buff_count = rank('w');
      else if canc_nod    then buff_count = rank('n');
      else if pos_max > max_pos_nodd then buff_count = rank('P');
      else if pos_max < min_pos_nodd then buff_count = rank('p');
      else if vel_max < max_vel_nodd then buff_count = rank('v');
      else do;          /* legal nodd */
         status = sddir;
         status = status + sdvel + 3;
         if wiggle_count>3 then status = status + 4;
         if status > 7 then status = status - 2;   /*yes-no have no initial direc
         ret_val.x = s.x;
         ret_val.y = s.y;
         end;
      state=0;
      end;
   end;
else if /*changing direction*/ cdvel^=dvel then do;
   if canc_nod then call start_nodd;
   if moving_count < moving_count_min-1 then do;
      wiggle_count = wiggle_count - 1;
      buff_count = rank('X');
      end;
   else do;
      wiggle_count = wiggle_count + 1;
      buff_count = rank('*');
      end;
   stationary_count = 0;
   moving_count = 0;
   cdvel = dvel;
   buff_wiggle_ct = wiggle_count;
```

```
        end;
else do;/*moving*/
    moving_count = moving_count + 1;        /* timeout & disregard long nods    */
    buff_count = moving_count + rank('A')-1;
    if moving_count >= moving count_max(bin(wiggle_count>0)) then do;
        canc_nod = true;
        buff_count = rank('x');
        end;
    end;

dcl arrow(-1:1,0:1) char(1) static initial('<','v',' ',' ','>','^');
buff.stat1(jjj) = rank(arrow(dvel,ddir))- rank('0');
buff.stat2(jjj) = buff_wiggle_ct;
buff.stat3(jjj) = buff_count - rank('0');
buff.stat4(jjj) = status;
if status = 0 then buff.stat4(jjj) = rank(' ') - rank('0');
return (status);

start_nodd: procedure;
state = 1;                      /* this code starts the nodd orf       */
sdvel = dvel;                   /* remember initial direction NSEW     */
cdvel = dvel;
sddir = ddir;
stationary_count = 0;
moving_count = 0;
canc_nod = false;
wiggle_count = 0;               /* count of the number of inflections */
pos_min = pos;
pos_max = pos;
vel_max = abs(vell);
buff_count = rank ('!');
end start_nodd;

pen_drvr_init: entry (r_addr) returns(fixed bin(15));
dcl i3 fixed bin(7);
/* r_addr and stauts are dummies */
if kx=0 | ky=0 then call error;
kx = max(32,kx);
ky = max(32,ky);
lx = div(div(llx,x_screen),kx)*16;  /* (llx/x_screen)*(1/(kx*256))*4096 */
ly = div(div(lly,y_screen),ky)*16;
/*lx = 4*4*80*2;     /* llx=4, x_screen=80, kx=128;*/
/*ly = 2*4*24*2;     /* lly=2, y_screen=24, ky=128;*/
n_roll = max(min(n_roll,hbound(old_x,1)),1);
n_roll3 = divide(n_roll*n_roll,4,15);
old = 1;
old_x = 0;
old_y = 0;
sa_x=0;sai_x=0;
sa_y=0;sai_y=0;
/*call xy_strng(0,0,'lx, ly, n_roll3 = ');
/*call pr_numb(lx,10,5);
/*call pr_numb(ly,10,5);
/*call pr_numb(n_roll3,10,5);*/
jjj = 1;
return (status);

end pen_drvr;
```

We claim:

1. A cursor positioning system for a data terminal having a display, comprising:
   A. a first radiation source and an associated first radiation sensor, wherein the radiation characteristics of one of said first source and first sensor has a substantially omnidirectional pattern over a predetermined angular segment, the radiation characteristic of the other of said first source and first sensor corresponds to the superposition of a plurality of directional patterns extending substantially from a single point, said plurality of patterns being substantially uniformly distributed over partially overlapping predetermined angular segments, said first sensor including means for generating a sensor signal associated with each of said directional patterns, said sensor signals being related to the radiational coupling between said first source and first sensor,
   B. means for fixing the position of one of said first source and first sensor with respect to said display and for fixing the position of the other of said first source and first sensor with respect to the head of an operator of said system,
   C. motion processing means responsive to said sensor signals and including means for extracting operator motion signals from said sensor signals and for generating position signals therefrom representative of the orientation of the operator's head, said extracting means including means for suppressing portions of said sensor signal representative of predetermined operator head motions, and
   D. means for generating cursor signals adapted for controlling the position of a cursor on said display in response to said position signals.

2. A system according to claim 1 wherein said other of said first source and first sensor has said directional radiation characteristic.

3. A system according to claim 2 further comprising:
   A. a second radiation source and an associated second radiation sensor, wherein the radiation characteristics of one of said second source and second sensor has a substantially omnidirectional pattern over a predetermined angular segment, the radiation characteristic of the other of said second source and second sensor corresponds to the supperposition of a plurality of directional patterns extending substantially from a single point, said plurality of patterns being substantially uniformly distributed over partially overlapping predetermined angular segments, said second sensor including means for generating a sensor signal associated with each of said directional patterns, said sensor signals being related to the radiational coupling between said second source and second sensor,
   B. means for fixing the position of one of said second source and second sensor with respect to said display and for fixing the position of the other of said second source and second sensor with respect to the head of an operator of said system wherein said one of said second source and said second sensor has said directional radiation characteristics.

4. A system according to claim 1 wherein said motion processing means includes means for detecting from said sensor signals the presence of signals representative of a succcession of substantially vertical relatively rapid up and down nod motions of said operator's head, and in response thereto generating position signals representative of a vertical nod.

5. A system according to claim 4 further comprising a programmed digital computer responsive to said vertical nod position signals.

6. A system according to claim 1 wherein said motion processing means includes means for detecting from said sensor signals the presence of signals representative of a succession of substantially horizontal left and right nod motions of said operator's head, and in response thereto generating position signals representative of a horizontal nod.

7. A system according to claim 6 further comprising a programmed digital computer responsive to said horizontal nod position signals.

8. A system according to claim 1 wherein said motion processing means includes means for detecting from said sensor signals the presence of signals representative of a single vertical, relatively rapid up nod motion spaced apart in time from other nod motions of said operator's head, and in response thereto generating position signals representative of an up-nod.

9. A system according to claim 8 further comprising to programmed digital computer responsive to said up-nod position signals.

10. A system according to claim 1 wherein said motion processing means includes means for detecting from said sensor signals the presence of signals representative of a single vertical, relatively raid down nod motion spaced apart in time from other nod motions of said operator's head, and in response thereto generating position signals representative of a down-nod.

11. A system according to claim 9 further comprising a programmed digital computer responsive to said down-nod position signals.

12. A system according to claim 1 wherein said source includes a reflector coupled to a remote radiation source pattern adapted to produce said source radiation characteristic.

13. A cursor positioning system according to claim 1 wherein the position of said radiation source is fixed with respect to the head of said operator.

14. A cursor positioning system according to claim 1 wherein the position of said radiation sensor is fixed with respect to the head of said operator.

15. A cursor positioning system according to claim 1 wherein the radiation characteristic of said radiation source has said substantially omnidirectional pattern.

16. A cursor positioning system according to claim 1 wherein the radiation characteristic of said radiation sensor has said substantially omnidirectional pattern.

17. A cursor positioning system according to claim 1 wherein said radiation source includes at least two infrared light emitting diodes (LED's).

18. A system according to claim 1 wherein said plurality of directional patterns form a rectangular four element array and wherein said motion processing means includes means for generating a first position signal proportional to the ratio of the detected intensities of light from one row of elements of said array to the detected intensities of light from all elements of said array, and for generating a second position signal proportional to the ratio of the detected intensities of light from one column of elements of said array to the detected intensities of light from all elements of said array.

19. A system according to claim 1 wherein said plurality of directional patterns form a rectangular four element array and wherein said motion processing means includes means for generating a first position signal proportional to the difference of the logarithm of the sum of the detected intensities of light from one row of elements of said array and the logarithm of the sum of the detected intensities of light from the other row of elements of said array, and for generating a second position signal proportional to the difference of the logarithm of the sum of the detected intensities of light from one column of elements of said array and the logarithms of the sum of the detected intensities of light from the other column of said array.

* * * * *